Dec. 30, 1969   M. J. BIRD   3,486,777
ADJUSTABLE SUPPORT FOR CYCLE SADDLE
Filed March 27, 1968
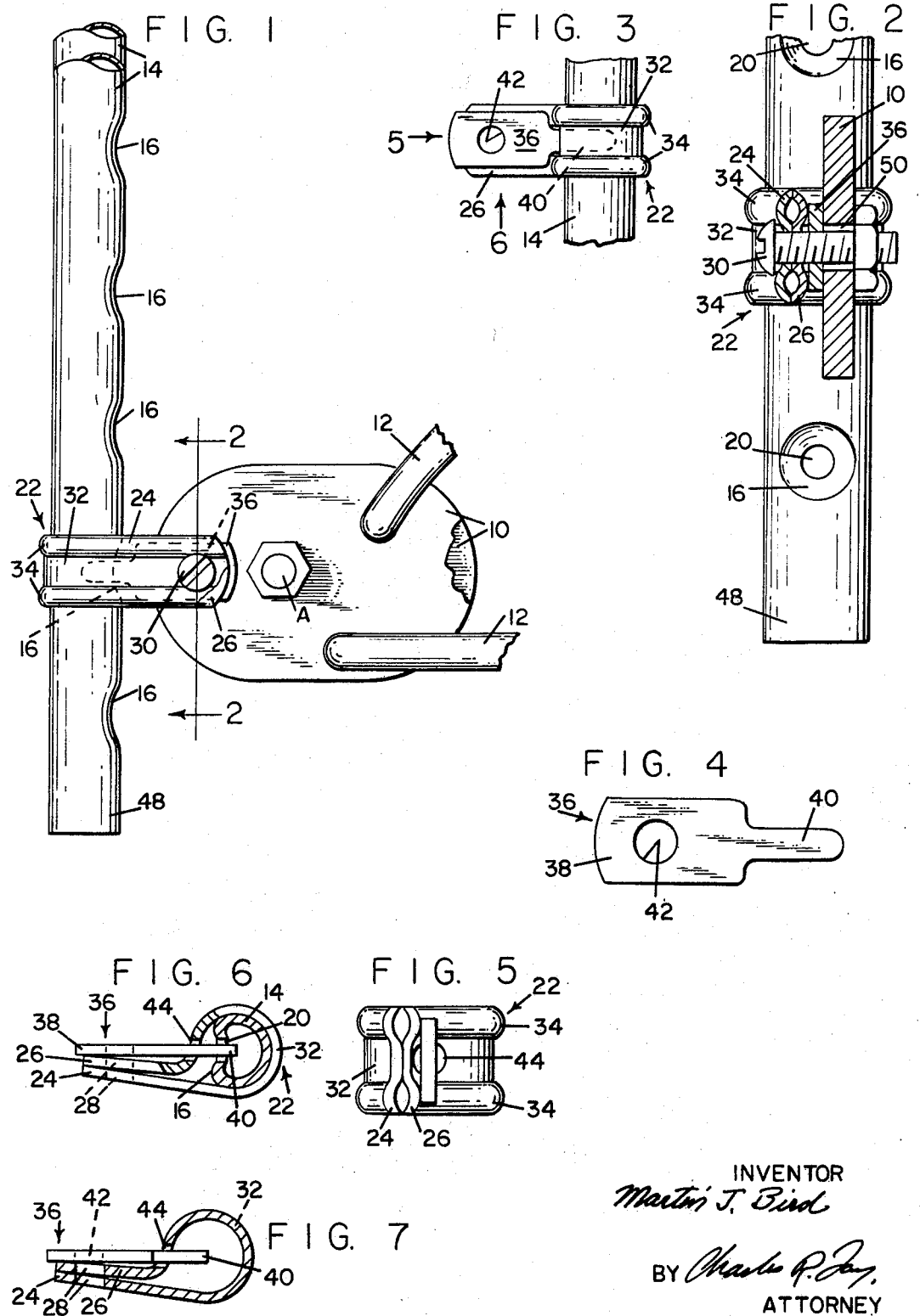
INVENTOR
Martin J. Bird
BY Charles P. Jay
ATTORNEY United States Patent Office 3,486,777
Patented Dec. 30, 1969

3,486,777
ADJUSTABLE SUPPORT FOR CYCLE SADDLE
Martin J. Bird, Norwalk, Ohio, assignor to Persons-Majestic Mfg. Co., Worcester, Mass., a corporation of Massachusetts
Filed Mar. 27, 1968, Ser. No. 716,523
Int. Cl. E04g 7/00
U.S. Cl. 287—54                                    1 Claim

ABSTRACT OF THE DISCLOSURE

An adjustable support for cycle saddles which comprises an elongated U-shaped member to be connected at the ends of the legs thereof, to the end plates of the rear wheel of the cycle, the legs extending upwardly for connection to the saddle at the rear portion thereof, the legs each having a series of holes, a clamping bracket surrounding each leg adapted to be bolted to the respective end plate, and a separate locking key removably attached with respect thereto and having a tang entering through a hole in the bracket into a selected hole in the respective legs of the support.

BACKGROUND OF THE INVENTION

The provision of adjustable supports, braces, or struts supporting a cycle saddle from the hub portion of the rear wheel, presents a problem in that it is difficult to provide an inexpensive adjustment which at the same time is quick and easy to operate while providing sufficient strength to stand up under the hard usage ordinarily given these members. It has been proposed to have a bracket surrounding each of the legs of the support, the bracket being bolted to the end plates and interengaging means on the bracket and the leg of the support, see copending patent application Ser. No. 607,678 filed Jan. 6, 1967, and now abandoned but this requires the disengagement of the interengaging means before the adjustment can be made.

SUMMARY OF THE INVENTION

The present invention solves this problem by providing a separate locking key having a tang which extends through a hole in the bracket and into a selected one of a series of holes in the respective leg of the U-shaped support, the bolt which attaches the bracket to the end plate of the hub also passing through an aperture in the locking key which maintains the parts in position. It will be seen that it is a very simple operation to remove the bolt, so that the key can be removed and then the bracket is easily moved along the leg because there are no interengaging parts between the bracket and the leg.

Furthermore the row of spaced apertures in each of the legs faces forwardly of the cycle rather than to the rear and this provides for a better appearance as well as for a handier place for manipulation of the parts.

BRIEF DESCRIPTION OF THE DRAWING

FIG. 1 is a view in front elevation illustrating the attachment of one of the legs of the support with relation to a respective end plate of a cycle;

FIG. 2 is a section on line 2—2 of FIG. 1 on an enlarged scale;

FIG. 3 is a view in rear elevation showing the bracket and locking key detached from the end plate;

FIG. 4 is a detail view of the locking key;

FIG. 5 is a view in elevation looking in the direction of arrow 5 in FIG. 3;

FIG. 6 is a bottom view looking in the direction of arrow 6 in FIG. 3, parts being in section, and FIG. 7 is a similar view with the leg of the support omitted.

DESCRIPTION OF THE PREFERRED EMBODIMENT

In illustrating the invention it is shown as applied to a generally conventional bicycle which has the usual frame, front wheel, handle-bars, saddle, etc., these not being shown as being unnecessary to an understanding of the invention. However reference numerals 10, 10 indicate the two end plates for usual frame parts 12, 12, the axle being shown at A, the end plates 10, 10 being generally parallel but spaced by the hub on the axle. The cycle saddle support is of the type comprising an elongated U-shaped member as is well known and in this case only the lower ends of the two legs thereof are shown, these being indicated at 14, 14. These members are alike and extend upwardly to be connected to the rear portion of the saddle as is well known in order to support the latter at the rear portion thereof.

In the present case the lower ends of the legs 14 are provided with a series of indentations 16, 16, 16, which are conveniently pressed or punched so as to provide a generally funnel-like impressed effect, see FIG. 2, surrounding the actual openings 20.

A bracket which is generally indicated at 22 is formed with a pair of substantially equal resilient legs 24, 26, these being correspondingly apertured as at 28, FIG. 6, to receive a fastener 30 securing the bracket to the respective end plate 10. The bracket legs 24 and 26 are formed from a single strip of metal, being connected by an intermediate substantially circular portion 32. This circular central portion is offset, leg 24 being substantially tangent with respect to bracket portion 32, whereas the other leg 26 is offset and can be superposed on leg 24 as clearly shown in FIG. 6. Thus the respective supporting leg 14 is embraced by the generally circular portion 32 of the bracket and is easily slid along the same because there are no interengaging parts. If desired, the bracket 22 may be provided with reenforcing edge ribs or the like 34, 34.

A separate locking key shown in FIG. 4 and indicated generally at 36 comprises in general a rectangular flat body member 38 having a reduced end tang 40. This key locks the bracket 22 to its respective leg 14, in longitudinally adjusted position with respect thereto, thus supporting the saddle in desired position.

The circular area 32 of the bracket is provided with a hole 44 adjacent the base of the leg 26 receiving the tang 40 of the locking key 36 when the parts are assembled as shown in FIGS. 1, 2 and 6.

To attach either leg with respect to its respective end plate, it is merely necessary to slide the circular portion 32 of the bracket 22 onto the leg from the free end thereof at 48 aligning the hole 44 with the desired hole at 20. The locking key is then placed in position with the tang extending through holes 44 and 20, and fastener 30 is then extended through the openings 28, 42 and a corresponding hole in end plate 10 which is indicated in FIG. 2 at 50. Upon tightening the fastener 30, the device is located in desired position. There are no interengaging parts between the bracket 22 and the respective leg 14 when the locking key is removed so that the bracket is easily slid along the leg. At the same time a positive mechanical lock is achieved which cannot shake loose so that a better connection between the end plate and the cycle saddle support is provided. It is inexpensive, easier to operate, and the holes 20 face forwardly of the vehicle rather than to the rear. The relatively smooth leg 24 of the bracket is to the exterior side of the end plate and makes a good appearance, whereas the locking key 36 is held between the bracket and the end plate 10 as shown in FIG. 2.

I claim:
1. A bracket for securing an elongated member to an end plate wherein said member is provided with a series of mutually spaced holes therein,
- a fastener for securing the bracket to the end plate, said bracket having a portion encompassing said elongated member,
- and a locking key, said locking key being separable from the bracket and including a portion engaging the bracket and entering a selected hole in the elongated member, said fastener securing the bracket, locking key and end plate together,
- the bracket including a pair of legs joined by but offset from the bracket portion which encompasses the elongated member, said legs being provided with corresponding apertures, there being an aperture in the locking key, the fastener securing the bracket and the locking key to the end plate and extending through the apertures in the end plate, the legs of the bracket, and the locking key,
- the bracket portion having an aperture therein for reception of the locking key which extends through the same and into a selected hole in the elongated member.

References Cited

UNITED STATES PATENTS

| | | | |
|---|---|---|---|
| 625,308 | 5/1899 | Alexander. | |
| 2,123,695 | 7/1938 | Elmer | 248—230 |
| 2,790,614 | 4/1957 | Miller | 248—74 |
| 3,408,090 | 10/1968 | Fritz et al. | 297—195 |

EDWARD C. ALLEN, Primary Examiner

U.S. Cl. X.R.

248—407